United States Patent Office 3,043,867
Patented July 10, 1962

3,043,867
METHOD FOR THE PURIFICATION OF AMINOCARBOXYLIC ACIDS
Robert E. Anderson, Midland, Mich., assignor to The Dow Chemical Company, Midland, Mich., a corporation of Delaware
No Drawing. Filed Oct. 16, 1959, Ser. No. 846,802
5 Claims. (Cl. 260—518)

This invention relates to the production of aminocarboxylic acids. It more particularly relates to a method for the purification, by ion exchange treatment, of amphoteric aminocarboxylic acids having a substantially cold-water insoluble isoelectric form.

In normal production procedures, phenyl monoamino monocarboxylic acid acids having a substantially cold-water insoluble isoelectric form, for example, anthranilic acid (ortho aminobenzoic acid), meta-aminobenzoic acid, and para-aminobenzoic acid, and phenylglycine (anilinoacetic acid) and the like are first prepared as a corresponding carboxylic alkali metal salt, and then precipitated in crude form directly from the reaction product solution. This crude acid subsequently is purified by two or more repetitive treatments of the following cycle; redissolution in mineral acid, decolorization of the solution by treatment with activated carbon, filtration and recrystallization of the acid by adjusting the pH of the solution with base. This method of purification of the acids is time consuming and expensive, both from the standpoint of labor and the treatment chemicals. Furthermore, the color of the so-purified product does not always reach the preferred standard. The disadvantages of this purification treatment method now unexpectedly have been overcome by the process of the present invention wherein the initial precipitation of the crude aminocarboxylic acid has been replaced by selective sorption, on an anion exchange resin, of the aminocarboxylate anion originally produced in the reaction product solution.

It is the principal object of the present invention to present a new, useful and heretofore unobvious method for the purification of aminocarboxylic acids having a substantially cold-water insoluble isoelectric form. An advantage of this method is that decreased chemical treatment costs are realized. Still another advantage of the invention is that processing time and process handling procedures are shortened. Still other objects and advantages will be recognized by one skilled in the art from the method description presented hereinafter.

According to this invention, a reaction solution containing the crude aminocarboxylate anion is contacted with a strongly basic quaternary ammonium anion exchange resin, hereinafter designated simply as the resin, this resin being in a chloride, acetate, nitrate, sulfate or other salt form. The aminocarboxylate anion is selectively sorbed onto the resin, and the residual waste liquor containing the bulk of the reaction-produced anionic and other colored impurities, remaining in the reaction solution, is separated from the resin and discarded. The resin is rinsed with water until a neutral effluent is obtained. The so-washed resin then is treated with an excess of an aqueous acid to strip the aminocarboxylate anion away from the resin by converting it into the corresponding water soluble acid salt, e.g., anthranilic acid hydrochloride. This aminocarboxylic acid salt is separated from the resin by rinsing the bed with water. The resulting aqueous aminocarboxylic acid salt solution is treated with base to so adjust the pH that the cold-water insoluble isoelectric form of the acid is regenerated in substantially pure crystalline form.

In this process, the particular quaternary ammonium anion exchange resins to be used for sorption of the individual aminocarboxylate anions necessarily are limited to those which show preferential selectivity for aminocarboxylate anions, e.g., an anion exchanger having trimethylbenzyl-ammonium as its active group, and which are of such a mesh size and porosity that they also give favorable exchange rates. Dowex 21K resin, the properties of which are fully described in the book Dowex::Ion Exchange, published by The Dow Chemical Company, Midland, Michigan (1958), is particularly effective for use with the aminocarboxylate anions. The anionic member of the salt form of the resin in turn is limited only in respect that this anion be less selectively held to the resin than is the aminocarboxylate anion. For example, passing a crude sodium anthranilate reaction solution through a bed of a strongly basic (Dowex 21K) quaternary trimethylbenzylammonium anion exchange resin in its chloride salt form, wherein the resin ranges from about 50 to about 100 mesh (U.S. Standard Sieve Series) in particle size, gives selective sorption of the anthranilate ion thereon over the other foreign and colored matter present in the product reaction solution. At the same time this particular resin particle size range permits the effluent waste liquor to pass through the bed at a satisfactory flow rate.

The feed flow rates will be determined for individual aminocarboxylate anions by the exchange rates of the ions with the resins. With 50–100 mesh Dowex–21K resin, or its equivalent, good sorption of the anthranilate ion is found at feed flow rates of about 0.5 gallon per minute per square foot of resin.

The maximum loading capacity of the resin for the aminocarboxylate anion varies with the individual aminocarboxylate anions, and the maximum load value for a given anion can be determined by analysis of the effluent waste liquor to determine the point of breakthrough of the acid anion, which point actually indicates the point of no further sorption of the acid anion by a given amount of resin. To illustrate, the loading capacity of anthranilate ion on the previously described quaternary trimethylbenzyl-ammonium resin in chloride salt form, is about 1 milliequivalent of anion sorbed per milliliter of loosely packed resin.

The degree or amount of sorption of the aminocarboxylate anion on the resin is partially dependent on the concentration of this anion in the feed. Excessive dilution of the feed results in a less effective loading of the anion on the resin. To illustrate, dilution of crude sodium anthranilate feed to about one-fourth that of its normal (8 to about 11 percent) anthranilate ion concentration, reduces the sorption of the anthranilate anion on the quaternary ammonium resin in chloride salt form from about 1 milliequivalent to about 0.7 milliequivalent of the ion per milliliter of the resin.

Deionized water preferably is used to rinse the resin bed both prior to and following the acid dissolution treatment. However, any good quality filtered water, having only a small amount of dissolved anionic and cationic substances normally found in natural waters, can be used.

The stripping acid used for treating the resin and the sorbed aminocarboxylate anion to remove this anion therefrom is chosen from those acids which give a soluble salt form of the aminocarboxylic acid. Normally, for convenience sake, the anion of the stripping acid will be the same as that of the resin form, but this is not essential. Examples of acids useful for the stripping action are hydrochloric, nitric, sulfuric, phosphoric and acetic. The concentration of the stripping acid as normally used is from about 5 to about 15 percent or more of the acid member on a weight basis, the balance being water. In the actual treatment of a resin bed it is not necessary to first prepare the dilute stripping acid, for concentrated acid and the necessary water of dilution independently can be added simultaneously to the bed. Although a simple gravity flow or counter-gravity flow acid treatment of a resin bed will strip the aminocarboxylate anion from the resin, the rate of stripping markedly is increased if the acid and water are introduced from the bottom of the bed and held in the reaction vessel for a short period (from about 5 to about 20 minutes) during which time intimate contact of the acid and the aminocarboxylate anion is promoted by stirring or agitation. It is further understood that the amount of stripping acid to be used must be sufficient to assure essentially complete formation of the soluble aminocarboxylic acid salt. Filtering the aqueous acid salt through a bed containing a small amount of activated carbon or similar other decolorizing material may be advantageous in some cases, but is not absolutely essential for the production of essentially white, crystalline aninocarboxylic acid.

The reprecipitation of the substantially pure, crystalline, aminocarboxylic acid from its soluble acid salt solution is achieved by adjusting the pH of the acid salt solution with an alkali metal basic compound, such as sodium hydroxide, sodium carbonate, potassium hydroxide, sodium bicarbonate, lithium hydroxide, potassium carbonate, lithium bicarbonate, potassium bicarbonate, lithium carbonate and the like. The pH of the acid salt solution is raised until the insoluble isoelectric form of the aminocarboxylic acid precipitates. Normally, with the various aminocarboxylic acids, the point of precipitation falls somewhere within the range from about pH 4 to about pH 7. In practical application, the reaction solution may be cooled during the conventional neutralization of the acid salt with the basic component if desired.

The following examples will serve to further illustrate the invention.

*Example 1*

A sample of crude sodium anthranilate product reaction mixture (121 grams, 100 milliliters) prepared by the reaction of phthalimide with sodium hypochlorite and caustic soda and having the following approximate composition, sodium anthranilate—11 percent, sodium carbonate—7 percent, sodium chloride—8 percent, balance water, was passed through a column containing a strongly basic quaternary ammonium anion exchange resin, Dowex 21–K, in its chloride salt form. The column had an inside diameter of about 0.5 inch and contained about 100 milliliters of about 50 to about 100 mesh resin. The crude product solution was passed through the bed at a flow rate of about 2 milliliters per minute. Following the flow of this feed, the resin bed was rinsed with deionized water until the effluent was neutral. The resin, with sorbed anthranilate anion, was removed from the column and drained. The drained resin was mixed with 20 grams of concentrated hydrochloric acid and 40 grams of water and the mixture then slurried back into the column. The resulting anthranilic acid hydrochloride was displaced downward through the column with a water rinse. A total of about 125 millimeters of the displaced acid salt solution resulted. This solution was filtered through a shallow bed of activated charcoal, the solution then cooled to about 10° C. and its pH adjusted to about 4.0 by addition of solid sodium carbonate whereupon anthranilic acid precipitated. The resulting white, crystalline anthranilic acid (8.1 grams) was filtered, washed with water and air dried.

*Example 2*

Crude sodium anthranilate solution (1180 gallons, 12,300 pounds) is taken from the product reactor, filtered and passed through a bed of about 190 cubic feet of a strongly basic quaternary ammonium anion exchange resin in its chloride salt form. The resin particles are in the size range from about 50 to about 100 mesh particle size, U.S. Standard Sieve Series. This resin is held in a 2,000 gallon rubber lined reactor equipped with a mechanical agitator and the crude anthranilate solution is permitted to flow through the resin bed at a flow rate of about 0.5 gallon per minute per square foot of resin bed. Following the flow of this feed stock, the bed is rinsed with about 2,000 gallons of high quality (low level of soluble cationic and anion values), filtered water at a flow rate of about 1 gallon per minute per square foot of resin bed. Part of the residual rinse water, trapped interstitially between resin particles can be drained or blown from the bed by an inert gas in order to keep the total volume of the stripping solution to a minimum. A mixture of hydrochloric acid (30 percent hydrogen chloride by weight, 390 gallons), and 190 gallons of water are introduced into the reactor from the bottom. Only this relatively small amount of excess water is needed to give a dilute acid of the desired 5 to 15 percent acid concentration because of presence of residual rinse water held by the resin. After the acid and water have been introduced into the reactor, the agitator is started and the resulting resin-aqueous acid slurry mixture stirred for about 10 to about 15 minutes to allow the anthranilic acid to precipitate and redissolve as the hydrochloride acid salt. The aqueous anthranilic acid hydrochloride solution is drawn off from the bottom of the reactor vessel. Substantially complete removal of the acid salt is assured by displacement with a water rinse injected from the top of the resin bed. The product solution is passed through a small bed of activated carbon, cooled to about 10° C., and substantially pure anthranilic acid is precipitated by adjustment of the acid salt solution to pH of about 4 with sodium carbonate. The crystalline product is removed from the residual liquid phase in a manner similar to that described in Example 1.

In a manner similar to the foregoing meta-aminobenzoate anion can be preferentially sorbed on a porous, strongly-basic quaternary ammonium anion exchange resin wherein the resin anion is acetate, the so-sorbed amino acid anion can be stripped from the resin with hydrochloric acid, and meta-aminobenzoic acid precipitated by adjustment of the pH of the resulting aqueous acid salt solution with sodium hydroxide. Para-aminobenzoate anion can be preferentially sorbed on a porous, strongly-basic quaternary ammonium anion exchange resin wherein the resin anion is sulfate, the so-sorbed amino acid anion can be stripped from the resin with sulfuric acid and the para-aminobenzoic acid precipitated by adjustment of the pH of the resulting aqueous acid salt solution with potassium bicarbonate. Anilinoacetic acid anion can be preferentially sorbed on a porous, strongly-basic quaternary ammonium anion exchange resin wherein the resin anion is nitrate, the so-sorbed amino acid anion can be stripped from the resin with nitric acid, and anilinoacetic acid (phenyl-glycine) precipitated by adjustment of the pH of the resulting aqueous acid salt solution with lithium hydroxide. Anthranilate anion can be preferentially sorbed on a porous, strongly-basic quaternary ammonium anion exchange resin wherein the resin anion is chloride, the so-sorbed amino acid anion can be stripped from the resin with acetic acid and the anthranilic acid precipitated by adjustment of the pH of the resulting aqueous acid salt solution with potassium carbonate. Any of the suggested amino acid anions can be sorbed on a porous, strongly-basic quaternary ammonium anion exchange resin using any of the suggested acid salt forms of the resin, the so-sorbed amino acid anion can be released with any of the suggested stripping acids, and the aminocarboxylic acid can be recovered as described heretofore.

Various modifications can be made in the present invention without departing from the spirit or scope thereof for it is understood that I limit myself only as defined in the appended claims.

I claim:

1. A process for the purification of an amphoteric phenyl monomamino monocarboxylic acid, the isoelectric form of said acid being substantially insoluble in water at temperatures up to about 10° C., which consists essentially of selectively sorbing a phenyl monoamino monocarboxylate anion onto a strongly basic quaternary ammonium anion exchange resin in a salt form, dissolving the sorbed aminocarboxylate anion on said resin in aqueous acid, said acid being a member selected from the group consisting of hydrochloric, nitric, sulfuric, phosphoric and acetic acids, separating the resulting aqueous acidic salt solution from said resin, and treating said aqueous acidic salt solution with base until the isoelectric point of the aminocarboxylic acid is reached thereby regenerating the aminocarboxylic acid.

2. A process for the purification of an amphoteric phenyl monoamino monocarboxylic acid, the isoelectric form of said acid being substantially insoluble in water at temperatures up to about 10° C., which consists essentially of selectively sorbing a phenyl monoamino monocarboxylate anion onto a strongly basic quaternary ammonium anion exchange resin in a salt form wherein the anionic member of said resin is selected from the group consisting of chloride, acetate, nitrate and sulfate, dissolving said sorbed aminocarboxylate anion in an aqueous acid wherein said aminocarboxylic acid forms a water-soluble acid salt, said aqueous acid being a member selected from the group consisting of hydrochloric, nitric, sulfuric, phosphoric and acetic acids, separating the acid salt solution from said resin, and raising the pH of the water-soluble acid salt solution to the range of from about 4 to about 7 thereby regenerating the aminocarboxylic acid.

3. The process of claim 2 wherein said aqueous acid is a solution containing from about 5 to about 15 percent of the acid member on a weight basis.

4. A process for the purification of anthranilic acid which consists essentially of selectively sorbing anthranilate anion onto a strongly basic quaternary ammonium based anion exchange resin in a salt form, contacting the so-sorbed anthranilate anion on the resin with an aqueous acid containing from 5 to about 15 percent of the acid member on a weight basis to prepare an aqueous solution of the corresponding water soluble acid salt of said anthranilic acid, said aqueous acid being a member selected from the group consisting of hydrochloric, nitric, sulfuric, phosphoric and acetic acids, separating said aqueous solution containing the soluble acid salt from said resin, partially neutralizing said aqueous solution to a pH of about 4 by adding a basic alkali metal compound thereto to precipitate anthranilic acid, and, separating the resulting substantially insoluble anthranilic acid therefrom.

5. A process for the purification of anthranilic acid, which consists essentially of sorbing ortho-anthranilate anion onto a quaternary trimethylbenzyl ammonium based anion exchange resin in its chloride form, contacting the sorbed anthranilate anion on said resin with aqueous hydrochloric acid containing from about 5 to about 15 percent hydrogen chloride to convert said anthranilate anion into its water soluble acid salt form whereby said anion is stripped from said resin, separating the acid salt solution from said resin, and regenerating substantially pure, crystalline anthranilic acid by adding sodium carbonate to said water soluble acid salt solution to adjust the pH of said solution to about 4.

References Cited in the file of this patent

UNITED STATES PATENTS 2,614,099     Bauman et al. _____ Oct. 14, 1952

OTHER REFERENCES

Samuelson: Ion Exchangers in Analytical Chemistry, pages 210–215, 1953. (Copy in library.)